United States Patent
Seshia et al.

(10) Patent No.: US 11,441,902 B2
(45) Date of Patent: Sep. 13, 2022

(54) METHOD OF OPTIMISING THE PERFORMANCE OF A MEMS RATE GYROSCOPE

(71) Applicant: Cambridge Enterprise Limited, Cambridge (GB)

(72) Inventors: Ashwin Arunkumar Seshia, Cambridge (GB); Xudong Zou, Beijing (CN)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 511 days.

(21) Appl. No.: 16/481,660

(22) PCT Filed: Jan. 30, 2018

(86) PCT No.: PCT/GB2018/050256
§ 371 (c)(1),
(2) Date: Jul. 29, 2019

(87) PCT Pub. No.: WO2018/138529
PCT Pub. Date: Aug. 2, 2018

(65) Prior Publication Data
US 2019/0360808 A1 Nov. 28, 2019

(30) Foreign Application Priority Data
Jan. 30, 2017 (GB) ..................... 1701496

(51) Int. Cl.
*G01C 19/5684* (2012.01)
*G01C 25/00* (2006.01)
(Continued)

(52) U.S. Cl.
CPC ..... *G01C 19/5684* (2013.01); *G01C 19/5677* (2013.01); *G01C 19/5755* (2013.01); *G01C 25/00* (2013.01)

(58) Field of Classification Search
CPC ............ G01C 19/5684; G01C 19/5677; G01C 19/567; G01C 19/56; G01C 19/5755; G01C 19/5691; G01C 25/00
See application file for complete search history.

(56) References Cited

U.S. PATENT DOCUMENTS

| | | | |
|---|---|---|---|
| 6,481,285 B1 * | 11/2002 | Shkel | G01C 19/5719 73/504.13 |
| 7,543,496 B2 | 6/2009 | Ayazi et al. | |

(Continued)

FOREIGN PATENT DOCUMENTS

| | | |
|---|---|---|
| EP | 0729010 A1 | 8/1996 |
| EP | 2010924 B1 | 9/2014 |
| WO | 2012078520 A1 | 11/2021 |

OTHER PUBLICATIONS

Pascheka, Patrick; "International Search Report and Written Opinion"; ISA/EPO; PCT/GB2018/050256; 14 pages; dated Apr. 24, 2018.

(Continued)

*Primary Examiner* — Helen C Kwok
(74) *Attorney, Agent, or Firm* — Todd A. Serbin; Nexsen Pruet, LLC

(57) ABSTRACT

A method of tuning a vibratory gyroscope, the method comprising the steps of: a) applying an AC drive signal to the drive electrode, the drive signal comprising a plurality of frequencies; b) sensing the response of the resonator to the drive signal at the first and second sense electrodes; c) determining a frequency of maximum response for the first mode of vibration, and determining a frequency of maximum response for the second mode of vibration; d) deriving a comparison result from a comparison of the frequency of maximum response for the first mode of vibration with the frequency of maximum response for the second mode of (Continued)

vibration; and e) applying a biasing voltage to one or more of the tuning electrodes dependent on the comparison result.

12 Claims, 5 Drawing Sheets

(51) Int. Cl.
*G01C 19/5677* (2012.01)
*G01C 19/5755* (2012.01)

(56) References Cited

U.S. PATENT DOCUMENTS

| | | | |
|---|---|---|---|
| 7,874,209 B2 | 1/2011 | Stewart | |
| 8,166,816 B2 | 5/2012 | Ayazi et al. | |
| 8,616,056 B2 | 12/2013 | Sammoura et al. | |
| 8,794,068 B2 | 8/2014 | Judy et al. | |
| 9,991,868 B1 * | 6/2018 | Nguyen | H03H 9/2405 |
| 10,444,014 B1 * | 10/2019 | Sorenson | G01C 19/5684 |
| 2003/0000306 A1 | 1/2003 | Fell | |
| 2007/0220972 A1 | 9/2007 | Araki et al. | |
| 2009/0301193 A1 * | 12/2009 | Schwartz | G01C 19/5684 |
| | | | 73/504.12 |
| 2009/0301194 A1 * | 12/2009 | Challoner | G01C 19/5684 |
| | | | 73/504.12 |
| 2012/0137774 A1 * | 6/2012 | Judy | G01C 19/5698 |
| | | | 73/504.12 |
| 2012/0227487 A1 | 9/2012 | Ayazi et al. | |
| 2013/0283911 A1 * | 10/2013 | Ayazi | G01C 25/00 |
| | | | 73/504.12 |
| 2014/0230547 A1 * | 8/2014 | El-Gamal | G01C 19/5698 |
| | | | 73/504.12 |
| 2015/0040663 A1 * | 2/2015 | Fell | G01P 15/14 |
| | | | 73/504.04 |

OTHER PUBLICATIONS

Nelson, Katy; "GB Search Report"; Intellectual Property Office (UK); GB1701496.0; 3 pages; dated Jul. 19, 2017.
Hobbs, John, MEng Thesis, University of Cambridge, copyright 2015 (50 pages).
Examination Report dated Oct. 26, 2021, United Kingdom Patent Application No. 1701496.0.
Baumgartner, "Development of a Microelectromechanical Bulk Acoustic Wave Gyroscope," copyright 2013, Thesis submitted in fulfilment of the requirements for the degree of Diplom-Ingenieur in Mechanical Engineering, Universität Stuttgart, University of Cambridge (137 pages).
International Preliminary Report on Patentability dated Aug. 8, 2019 in PCT/GB2018/050256 (12 pages).
JH805 Final Report (50 pages).
Johari et al., "Capacitive Bulk Acoustic Wave Silicon Disk Gyroscopes," copyright 2006, School of Electrical and Computer Engineering, Georgia Institute of Technology (4 pages).
Johari, "Micromachined Capacitive Silicon Bulk Acoustic Wave Gyroscopes," copyright 2008, Dissertation Presented to The Academic Faculty, Georgia Institute of Technology (201 pages).
Yoon et al., "Vibration Sensitivity Analysis of MEMS Vibratory Ring Gyroscopes," copyright 2011, Sensors and Actuators A 171, pp. 163-177 (16 pages).
Didier Keymeulen et al: "Hardware platforms for MEMS Gyroscope Tuning Based on Evolutionary Computation Using Open Loop and Closed-Loop Frequency Response", Jan. 1, 2005, 12 pages.

* cited by examiner a) Drive mode  b) Sense mode

METHOD OF OPTIMISING THE PERFORMANCE OF A MEMS RATE GYROSCOPE

FIELD OF THE INVENTION

The present invention relates to micro-electro-mechanical systems (MEMS) gyroscopes and in particular to optimising the sensitivity of a MEMS gyroscope.

BACKGROUND TO THE INVENTION

Accelerometers and gyroscopes are in wide use today for a variety of motion sensing applications ranging from inertial navigation to vibration monitoring. Accelerometers measure changes in acceleration (linear or rotational) while gyroscopes provide information about angular motion (rotation). These devices use the inertial properties of light or matter for their operation and have hence been broadly classified as 'inertial sensors'.

Inertial sensors have traditionally served navigation markets. Macroscale gyroscopes and accelerometers are used to provide information about the position, orientation and velocity for aircraft and naval vessels. They have also been incorporated into control systems that are used for robotic applications, such as missile guidance, unmanned aircraft, and industrial machine control. Commercial inertial navigation grade sensors are available from Honeywell Corporation, Northrop Gumman and Naysys Corporation, amongst others.

While these macroscopic accelerometers and gyroscopes still remain the premier instruments for inertial grade navigation systems, microscopic mechanical inertial sensors fabricated using MEMS technology have been perceived as a breakthrough in inertial navigation and motion sensing, due to the substantial reduction in cost, size and power that may be achieved in such micromechanical sensors relative to their macroscopic counterparts. These attributes have enabled the use of such inertial sensors in a variety of applications that have traditionally not been possible due to either their prohibitive cost or size restrictions, for example, in mobile phones, MP3 players, PDAs, notebooks, surgical instruments etc. Commercial MEMS inertial sensors are now available from Analog Devices Inc., Motorola, ST Microelectronics and Silicon sensing systems amongst several others.

Almost all current designs for MEMS gyroscope devices are rate-sensing vibratory designs. These designs can be made with different geometries but all operate according to the same principle. Energy is transferred between two orthogonal vibratory modes by the Coriolis effect, with one mode being externally excited by a drive signal and the other mode being sensed to determine the Coriolis force.

The sensitivity of a gyroscope using this principle depends on the amplitude of oscillation of the sense mode for a given angular rate. This depends both on the amplitude of the drive mode and the efficiency with which energy is transferred from the drive mode to the sense mode. In order to maximise both the drive mode amplitude and the sense mode response, it is advantageous for modes to operate at resonance. Because the input force from the Coriolis effect acts at the same frequency as the drive mode frequency, it is advantageous for both the drive and sense modes to have the same resonant frequency.

Two-dimensional axisymmetric structures such as discs and rings are viewed as good candidates for high-performance gyroscopes due to the fact that the modal degeneracy inherent in these structures may be utilized to provide inherently improved mode-matched conditions and hence higher sensitivity. Disc configurations are particularly interesting in this context as they enable the interrogation of high-Q bulk acoustic modes at high frequencies thereby combining the advantages of mode-matching with increased bandwidth without the addition of significant external control circuitry. However, for practical micro-fabricated devices, the modal frequencies associated with the bulk modes in an single crystal silicon (SCS) disc exhibit splitting not ordinarily predicted for isotropic systems. The origin of this modal splitting arises due to a variety of reasons including anisotropy in material properties, geometrical imperfections and fabrication tolerances inherent to the manufacturing process and limitations on the anchoring arrangement that set a limit to the structural symmetry achievable in these devices. Therefore, in all practical scenarios the so-called degenerate modes are never perfectly matched. The fabrication imperfections and anchoring arrangements also impact the mode shape resulting in a distortion from the ideal scenario and less than optimal coupling of the response to surrounding electrodes and increased undesired cross-axis coupling.

It is an object of the invention to achieve mode-matched operation for an edge-anchored vibratory gyroscope and to minimize cross-axis coupling and enhance transduction efficiencies for the modes of interest.

SUMMARY OF THE INVENTION

In one aspect, there is provided a method of tuning a vibratory gyroscope, the gyroscope comprising: an axisymmetric resonator, a frame, the resonator fixed to the frame through at least three separate anchors, a plurality of electrodes, each electrode positioned on the frame or the resonator, wherein the plurality of electrodes comprises at least one drive electrode through which a drive signal is input to excite a first mode of vibration of the resonator, at least one first sense electrode configured to sense the first mode of vibration of the resonator, at least one second sense electrode configured to sense a second mode of vibration of the resonator, orthogonal to the first mode, and at least first and second tuning electrodes to which DC biasing voltages may be applied, the method comprising the steps of:

a) applying an AC drive signal to the drive electrode, the drive signal comprising a plurality of frequencies;

b) sensing the response of the resonator to the drive signal at the first and second sense electrodes;

c) determining a frequency of maximum response for the first mode of vibration, and determining a frequency of maximum response for the second mode of vibration;

d) deriving a comparison result from a comparison of the frequency of maximum response for the first mode of vibration with the frequency of maximum response for the second mode of vibration;

e) applying a biasing voltage to one or more of the tuning electrodes dependent on the comparison result.

Advantageously, the method further comprises, after step e), repeating steps a) to e) until the frequency of maximum response for the first mode of vibration is determined to be equal to the frequency of maximum response for the second mode of vibration in step d). This iteration of the process may be used to provide an exact match frequency match between the first and second modes of vibration, which improves the sensitivity of the gyroscope.

Depending on the nature of the initial mismatch between the modes it may be advantageous to configure different electrodes as drive, sense and tuning electrodes. Advantageously, the method further comprises, prior to step a), applying a preliminary drive signal to an electrode on the resonator, the preliminary drive signal comprising a plurality of frequencies, sensing the response of the resonator to the preliminary drive signal at a plurality of the electrodes, and determining which electrodes to operate as drive, sense and tuning electrodes based on the sensed response of the resonator to the preliminary drive signal.

It may also be beneficial to select a particular one of the first and second modes to tune. Advantageously, the method comprises, in step d), determining which of the tuning electrodes to apply the biasing voltage to, based on the comparison result.

Advantageously, after the step of deriving the comparison result, the method comprises comparing the comparison result with a previous comparison result to determine which of the tuning electrodes to apply the biasing voltage to. If the comparison result is not an improvement on the previous comparison result, it may be beneficial to progress to a different phase of the tuning process.

The method may comprise, in a mode frequency tuning process, repeating steps a) to e) for a set of one or more first tuning electrodes until a difference between the frequency of maximum response for the first mode of vibration and the frequency of maximum response for the second mode of vibration is reduced to a minimum non-zero value, and subsequently, in a mode decoupling process, repeating steps a) to e) for a set of one or more second tuning electrodes until the frequency of maximum response for the first mode of vibration is determined to be equal to the frequency of maximum response for the second mode of vibration in step d).

Advantageously, the method comprises, in step d), determining a magnitude of the biasing voltage dependent on the comparison result. Typically, the greater the frequency mismatch the greater the biasing voltage needs to be to achieve a frequency match between the modes.

The magnitude of the biasing voltage may be varied from a previous biasing voltage by a predetermined amount. Small increments may be used, particularly if the variation is always in one direction, e.g. always increasing the biasing voltage. However, it may be possible to increase the biasing voltage in one iteration and reduce the biasing voltage in a subsequent iteration of the tuning process.

The drive voltage may be controlled to provide a first mode of constant amplitude. The amplitude of the drive mode is determined based on signals from the first sense electrode. The angular acceleration experienced by the sensor may then be determined from an amplitude of the second mode which is determined based on signals from the second sense electrode.

The method advantageously comprises recording a value of the biasing voltage or biasing voltages when the frequency of maximum response for the first mode of vibration is equal to the frequency of maximum response for the second mode of vibration. The recorded value of the biasing voltage or biasing voltages may then be used during operation of the gyroscope.

The resonator may be a disc resonator. The resonator may be a circular disc. The resonator and frame may comprise a single crystal of silicon. The resonator preferably has a diameter, width or length at least 20 times its thickness and preferably at least 100 times its thickness.

In one embodiment, the gyroscope comprises twelve electrodes on the frame, positioned around the resonator and one electrode positioned on the resonator. In another embodiment, the gyroscope comprises eight electrodes on the frame, positioned around the resonator and one electrode positioned on the resonator.

The resonator may be fixed to the frame through four anchors.

Advantageously, the drive signal excites first and second trigonal modes of vibration of the resonator.

BRIEF DESCRIPTION OF THE DRAWINGS

Embodiments of the invention will now be described in detail, by way of example only, with reference to the accompanying drawings, in which.

DETAILED DESCRIPTION

Figure 1:
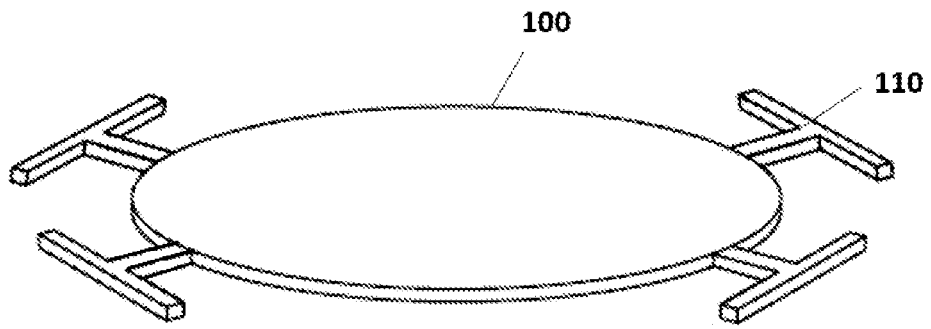
FIG. 1 is a schematic perspective view of an edge anchored disc resonator that can be used in a gyroscope in accordance with the invention.

FIG. 1 is a schematic perspective view of an edge anchored disc resonator that can be used in a gyroscope in accordance with an embodiment of the invention. The disc 100 is circular and has a radius of 750 μm. The disc 100 is 25 μm thick. The disc 100 is formed from a single crystal of silicon. The disc 100 is suspended from a frame (not shown) by four T shaped anchors or flexures 110.

A disc resonator as shown in FIG. 1 can be driven in different vibrational modes by exciting the disc. This can be done using electrodes adjacent to the disc and adjusting a voltage between the disc and the electrodes. By maintaining the disc at a ground voltage and applying a time varying voltage to one or more electrodes adjacent to the disc, a time varying electrostatic force is applied to the disc, causing it to vibrate. Different modes can be excited depending on the frequency of the drive force and depending on the shape of the disc and position of the anchors, as well as the material properties of the disc.

Figure 2:
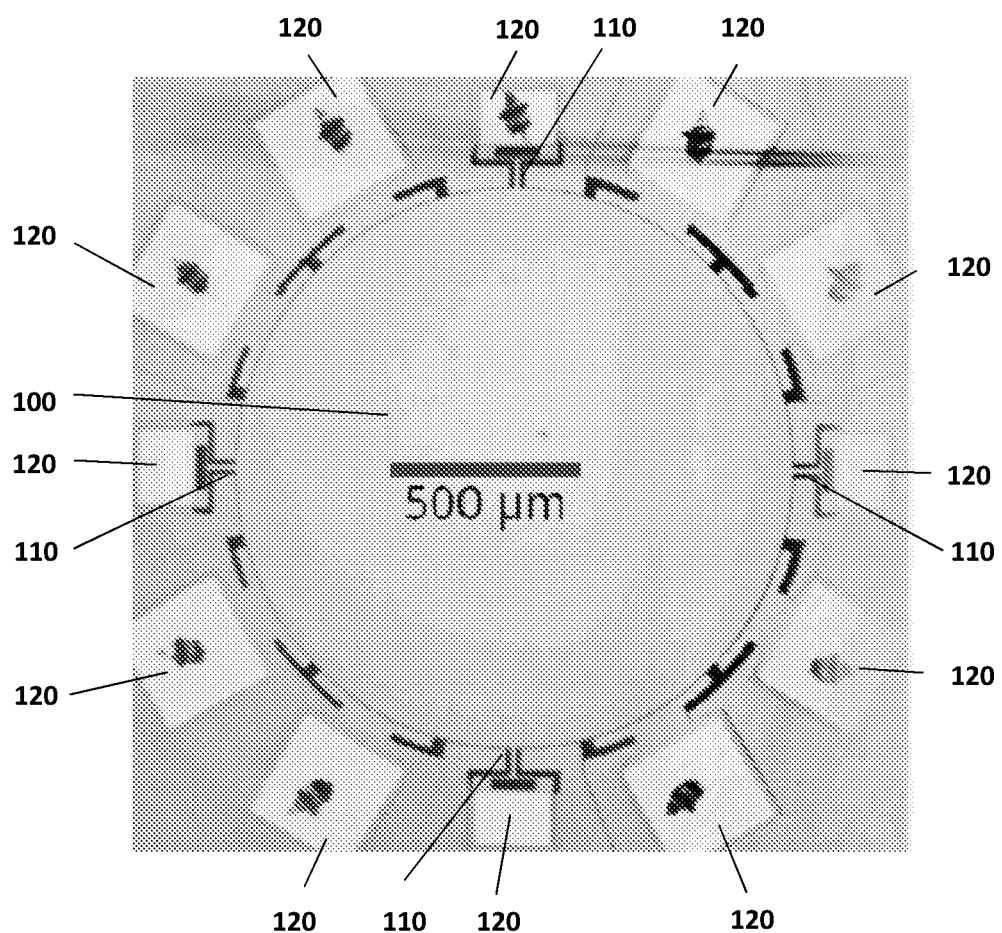
FIG. 2 is a plan view of a gyroscope comprising an edge anchored disc resonator of the type shown in FIG. 1, with twelve electrodes arranged around its circumference.

FIG. 2 is a micrograph of a disc resonator of the type shown in FIG. 1. FIG. 2 also shows 12 electrodes equally spaced around the periphery of the disc. The electrodes 120 are used to drive the disc into a particular mode of vibration and to sense the vibration of the disc. As shown in FIG. 2, an electrode is provided at the location of each of the anchors 110. In this embodiment the anchors are aligned with the <110> direction of the silicon crystal. Additional electrodes are provided between the anchors. Contact pads for each electrode are deposited on the frame to allow for the bonding of leads to each electrode.

For use as a gyroscope, it is desirable to have two orthogonal modes (Mode A and Mode B) that are matched in resonant frequency. With the arrangement shown, with 12 electrodes, it is advantageous to operate using third order elliptical modes. There are two orthogonal third order degenerate elliptical modes that can be coupled to one another through the Coriolis force.

Figure 3:
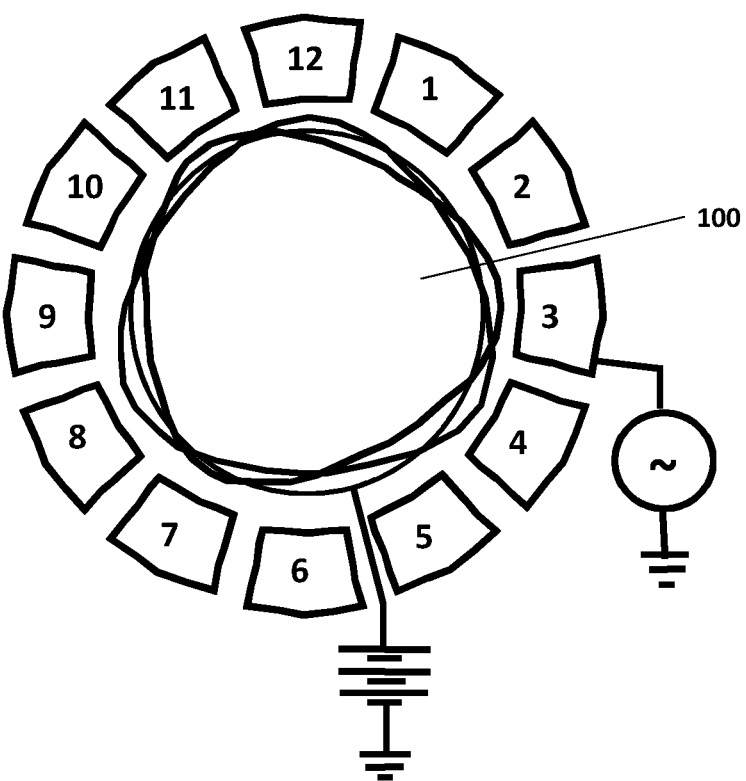
FIG. 3 is a schematic plan view of a gyroscope of the type shown in FIG. 2.

FIG. 3 is a schematic illustration of a disc resonator being excited in two degenerate third order elliptical modes. The disc 100 is surrounded by 12 electrodes, each labelled with a port number from 1 to 12. An oscillating voltage is applied to one of the surrounding electrodes and the disc itself is held at a ground potential. The oscillating voltage is a drive signal and the electrode to which it is applied is designated a drive electrode or driving port. The drive signal excites a first of the modes. The second of the modes is excited by coupling from the first of the modes. The modes are essentially trigonal and it can be seen that they are orthogonal to one another.

Figure 4:
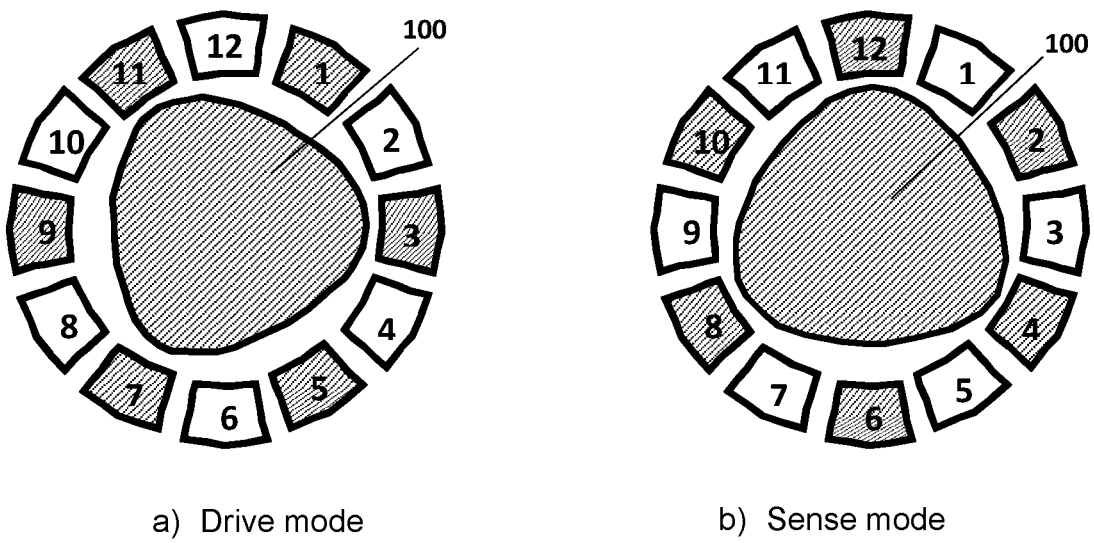
FIG. 4a is a schematic plan view of a gyroscope of the type shown in FIG. 2 illustrating a drive mode of vibration.
FIG. 4b is a schematic plan view of the gyroscope shown in FIG. 4a illustrating a sense mode of vibration.

FIG. 4 shows the modes of FIG. 3 split into drive and sense modes. Each of the surrounding electrodes is given a port number, as in FIG. 3, which will be referred to in the tuning process described with reference to FIGS. 5 to 8. FIG. 4a illustrates the drive mode, which is the mode excited by the applied voltage. FIG. 4b illustrates the sense mode, which is the mode excited by the Coriolis force coupling from the drive mode.

In order to maximise both the drive mode amplitude and the sense mode response, it is advantageous for the modes to operate at resonance. Because the input force from the Coriolis effect acts at the same frequency as the drive mode frequency, it is advantageous for both the drive and sense modes to have the same resonant frequency. In order to maximise the Coriolis coupling, and eliminate cross-axis coupling, it is advantageous that the two modes are exactly orthogonal to one another. However, as explained, in practice the two modes are never exactly matched in frequency and orientation because of material imperfections and anisotropy, geometrical imperfections and fabrication tolerances inherent to the manufacturing process, and limitations on the anchoring arrangement that set a limit to the structural symmetry achievable.

By selectively applying biasing voltages to the surrounding electrodes it is possible to match the two degenerate modes, both in frequency and orientation. However the biasing voltages required will be different for each device.

FIGS. 5 to 8 illustrate a tuning process for determining the required biasing voltages for a structure as illustrated in FIGS. 2, 3 and 4.

During the tuning process and during operation of the gyroscope, each of the electrodes may be a driving port, a sense port or a tuning port. The disc itself is also a port, but is preferably held at ground potential to minimise any vertical forces on the disc due to coupling with the underlying silicon structure. A driving port is used to actuate the disc at a resonant frequency. Typically a driving port will be connected to a fixed DC bias voltage and an AC signal source. A sense port is used to measure the amplitude of the disc resonance at a particular position. A sense port may be fixed to a DC bias voltage as well as being connected to a signal processing circuit for receiving an AC signal from the sense port. A tuning port is used to change the effective stiffness of the disc by applying an electrostatic force on the disc. Each tuning port is connected to a tuneable DC bias voltage.

Figure 5:
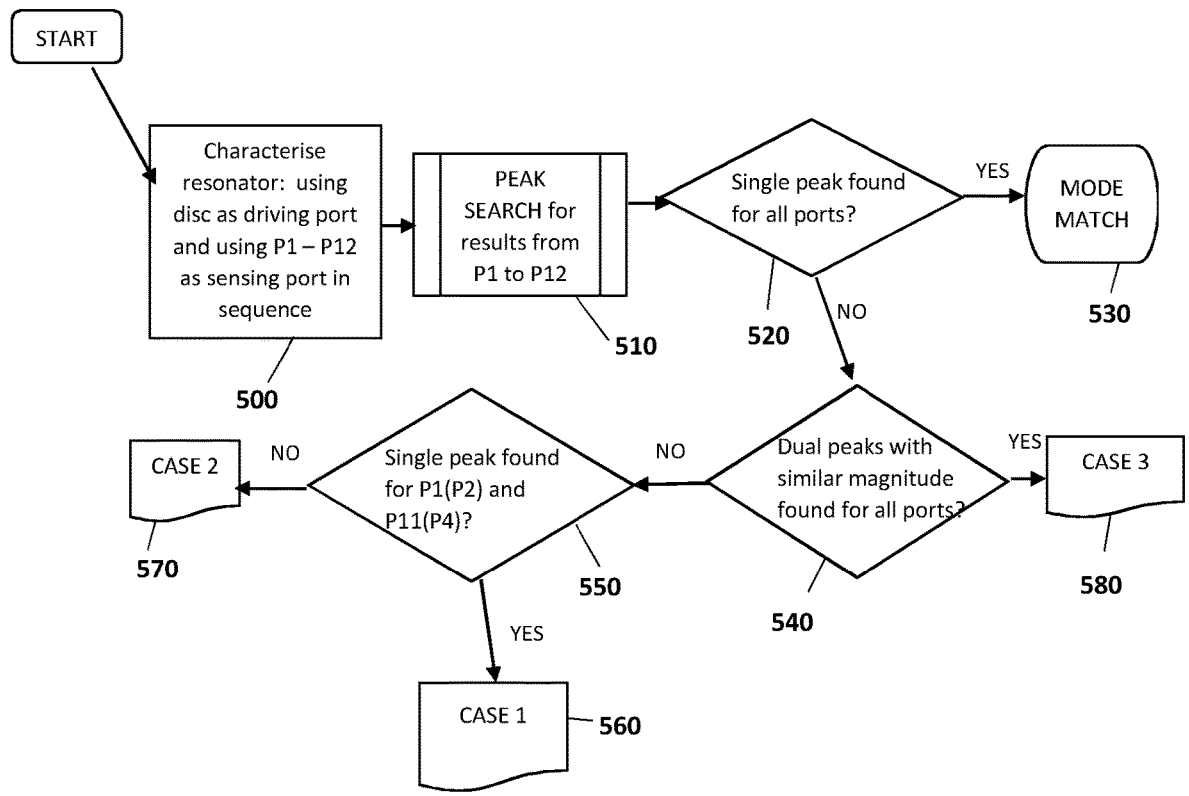
FIG. 5 is a flow diagram of a first phase in a tuning process of the invention.

A first stage in the tuning process is illustrated in FIG. 5. The process of FIG. 5 is carried out to determine the orientation of the two degenerate modes and so to determine which electrodes will be used as driving ports, which electrodes will be used as sense ports and which electrodes (if any) will be used as tuning ports. In a first step 500, the disc resonator is characterised using the disc as the driving port. In the process of characterisation, the disc is actuated through one driving port. The actuation signal is a frequency sweep signal comprising a predetermined frequency range and a constant amplitude for all frequencies. The response of the resonator is measured at each of ports 1 to 12.

In step 510, the frequency of maximum response from within the predetermined frequency range is determined for each of ports 1 to 12. If, in step 520, there is a single peak response, which is at the same frequency for all ports, then the degenerate modes are matched in frequency without the need for any further tuning. This is very unlikely, but is shown in box 530. If in step 520, the peak response is not the same for all ports, then the process moves to step 540, in which it is determined if dual maximum peaks are found for all ports. If the answer is no, the process moves to step 550, in which it is determined if a single peak is found for port 1 and port 11, or for port 4 and port 2 as the drive mode. If the answer is yes, then the ports are configured as Case 1 in FIG. 6. If the answer is no, then the ports are configured as Case 2 in FIG. 6. If the answer at step 540 is yes, then the ports are configured as Case 3 in FIG. 6.

Figure 6:
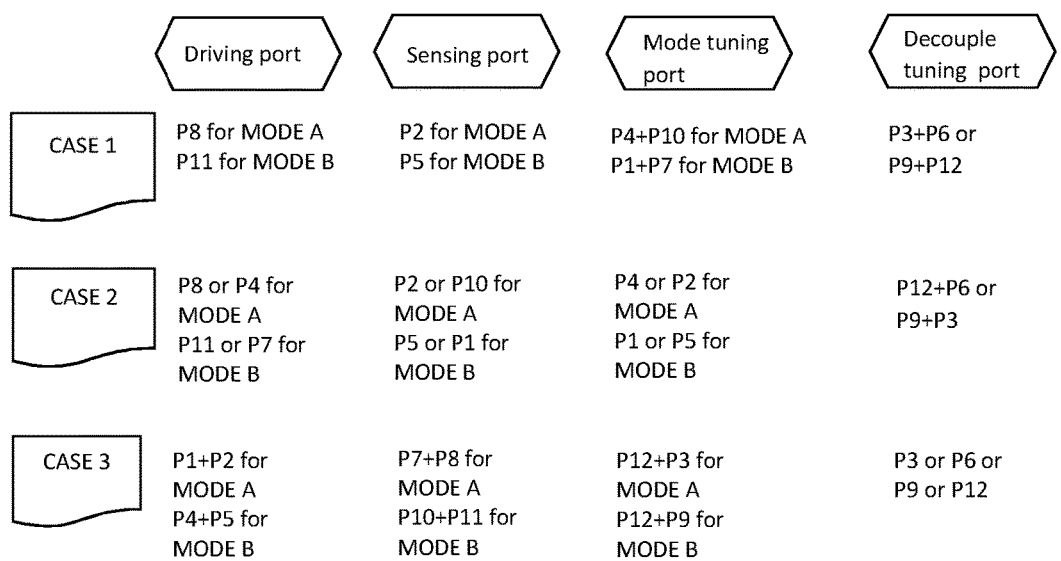
FIG. 6 is a flow diagram of a second phase in a tuning process of the invention.
Figure 7:
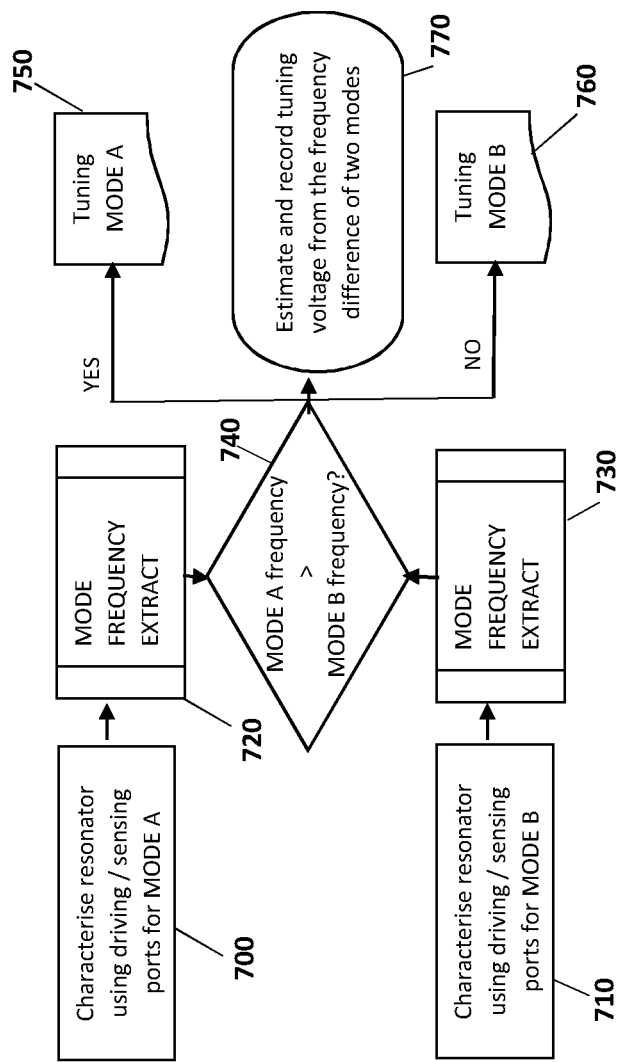
FIG. 7 is a flow diagram of a third phase in a tuning process of the invention.

FIG. 6 is a table showing the possible configuration for the ports for each of Case 1, Case 2 and Case 3. For each case there are two possible tuning modes, depending on whether Mode A is to be tuned or Mode B is to be tuned. The process illustrated in FIG. 7 is used to determine which mode to tune.

In different cases, one or two ports may be used as driving ports and one or two ports may be used as sense ports. In each case, there are two different types of tuning ports, each performing a different type of tuning. The mode tuning ports are used to adjust the resonant frequency of one or other of the modes. By changing the DC bias on the mode tuning port the resonant frequency is altered. Typically, an increase in the DC bias voltage will lower the resonant frequency of the corresponding mode.

The decouple tuning ports are used to cancel the mechanical coupling between the two modes. The mechanical coupling stiffness can be balanced by an electrostatic coupling stiffness by applying an appropriate DC bias on a decouple tuning port or ports.

It is easier to tune the mode with the higher resonant frequency, as applying a DC bias voltage to the appropriate tuning port will lower the resonant frequency. FIG. 7 illustrates the process for selecting which mode to tune. In step 700 the resonator is characterised using the port configuration from Mode A. In the process of characterisation, the disc is actuated through the driving port or ports. The actuation signal is a frequency sweep signal comprising a predetermined frequency range and a constant amplitude for all frequencies. The response of the resonator is measured at the sense port or ports. In step 720 the frequency of the actuation signal giving rise to the maximum sensed output signal is determined. The same process is carried out for Mode B in steps 710 and 730. In step 740 a comparison is made between the outcome of steps 720 and 730. If the maximum output for Mode A occurs at a higher frequency than it does for Mode B, then Mode A is chosen for tuning in step 750. If the maximum output for Mode A occurs at a lower frequency than it does for Mode B, then Mode B is chosen for tuning in step 760. In either case, in step 770, the magnitude of frequency difference between the maximum output for Mode A and the maximum output for Mode B is recorded and used to determine the magnitude of an estimated tuning voltage to be applied to the mode tuning port or ports. The frequency difference between Mode A and Mode B is used to calculate the difference of effective mechanical stiffness of the two modes. Once the stiffness difference is known, the required DC tuning voltage to compensate it can be estimated from the electrostatic spring softening effect model.

Figure 8:
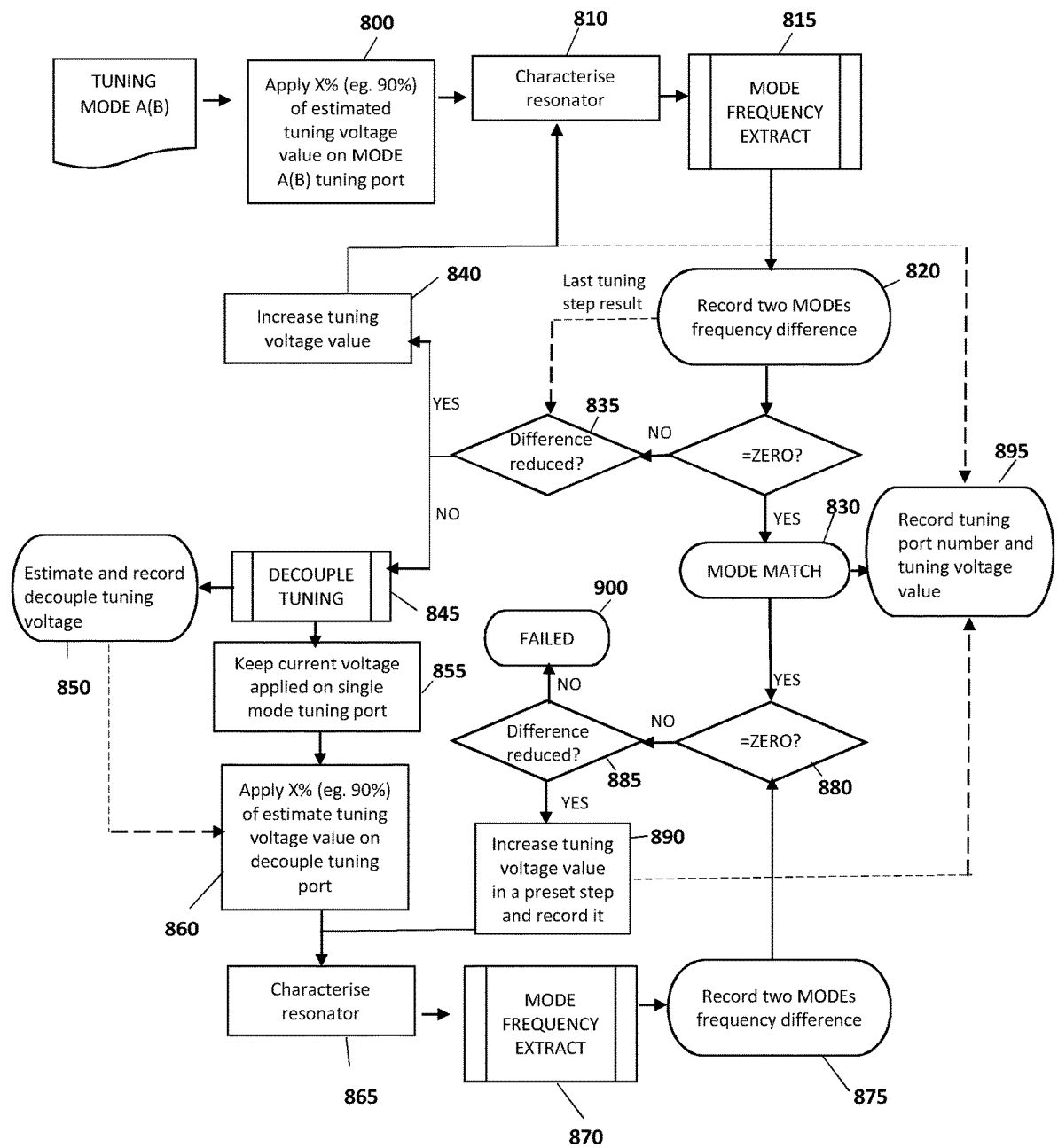
FIG. 8 is a flow diagram of a fourth phase in a tuning process of the invention.

Having established which mode to tune and the configuration of the ports, the tuning process can begin. This is illustrated in FIG. 8.

In step 800 a proportion, for example 90%, of the estimated tuning voltage is applied to the tuning port for the particular mode selected for tuning. The estimated tuning voltage is based on the frequency difference determined in step 770. In step 810, the resonator disc is again characterised for both modes A and B separately. The characterising steps are as described with reference to steps 700 and 710 of FIG. 7. Then, in step 815, the frequency of the actuation signal giving rise to the maximum sensed output signal, referred to as the mode frequency, is determined for each mode, as in steps 720 and 730. The difference between the mode frequencies is then determined in step 820.

If there is no difference between the mode frequencies, then the two modes are matched and the process ends with step 830 and step 895, in which the tuning voltage applied and the ports to which the tuning voltage has been applied are recorded so that the required tuning can be applied later, during operation of the gyroscope.

If there is difference between the mode frequencies, then a determination is made in step 835 of whether the difference is reduced in comparison with a previously recorded difference in mode frequency using a previous value for the tuning voltage. If the difference in mode frequency has reduced, then the tuning voltage is incremented in step 840 by a predetermined amount, say a further 2% of the estimated tuning voltage, and the process then returns to step 810. As long as the difference in mode frequency continues to reduce, but remains non-zero, the tuning process will continue with small increments in the applied tuning voltage.

If in step 835 it is determined that the difference in mode frequency has not decreased with the latest tuning voltage, then a process of decouple tuning starts as shown by box 845. Decouple tuning counteracts unwanted mechanical coupling between the modes. In step 850 a required decouple tuning voltage to be applied to the decouple tuning port or ports is estimated based on the remaining difference in mode frequencies. The remaining difference in mode frequencies is used to derive the residual coupling stiffness between the two modes. The residual coupling stiffness is then used to estimate the required decouple tuning voltage. The latest value for the tuning voltage applied to the mode tuning port or ports is maintained, as detailed in step 855. A proportion, such as 90%, of the estimated decouple tuning voltage is applied to the decouple tuning port or ports in step 860.

An iterative process of checking the mode frequency match and increasing the decouple tuning voltage is then carried out in the same way as it was for the mode tuning voltage in steps 810 to 840. In step 865, the resonator disc is again characterised for both modes A and B separately, as in step 810. In step 870 the mode frequency is determined for each mode, as in step 815. In step 875 the difference between the mode frequencies is then determined, as in step 820.

If there is no difference between the mode frequencies, as determined in step 880, then the two modes are matched and the process ends with step 830 and step 895, in which the tuning voltage applied and the ports to which the tuning voltage has been applied are recorded so that the required tuning can be applied later, during operation of the gyroscope.

If there is difference between the mode frequencies, then a determination is made in step 885 of whether the difference is reduced in comparison with a previously recorded difference in mode frequency using a previous value for the decoupling tuning voltage. If the difference in mode frequency has reduced then the decoupling voltage is incremented in step 890 by a predetermined amount, say a further 2% of the estimated tuning voltage and the process then returns to step 865. As long as the difference in mode frequency continues to reduce, but remains non-zero, the decouple tuning process will continue with small increments in the applied decouple tuning voltage.

If in step 885 it is determined that the difference in mode frequency has not decreased with the latest increment of decouple tuning voltage, then the process ends in step 900, with mismatched modes. The gyroscope can either be rejected as a result of the mismatched modes or it may be operated with the mode tuning and decouple tuning voltages providing the closest result to a mode match.

Although the invention has been described with reference to one particular construction of gyroscope, namely a circular disc resonator with 12 electrodes positioned around its periphery, and four anchors, it should be clear that the same tuning principles can be applied to different constructions. For example, 8 electrodes may be used instead of 12. In that case a different mode of vibration may be chosen, such as a second order mode. Different shapes of resonator may be used and differently positioned anchors and numbers of anchors may be used.

A method of tuning a gyroscope in accordance with the invention may be used for tuning gyroscopes for use in a number of different applications. Gyroscopes of the type described may be used for remotely positioning tools down oil and gas wells, for dead reckoning systems in driverless cars and in gyroscopic compasses.

The invention claimed is:

1. A method of tuning a vibratory gyroscope, the gyroscope comprising: an axisymmetric disc resonator, a frame, the resonator fixed to the frame through at least three separate anchors, a plurality of electrodes, each electrode positioned on the frame or the resonator, wherein the plurality of electrodes comprises at least one drive electrode through which a drive signal is input to excite a first mode of vibration of the resonator, at least one first sense electrode configured to sense the first mode of vibration of the resonator, at least one second sense electrode configured to sense a second mode of vibration of the resonator, orthogonal to the first mode, and at least first and second tuning electrodes to which DC biasing voltages may be applied, the method comprising the steps of:
   a) applying an AC drive signal to the drive electrode, the drive signal comprising a plurality of frequencies;
   b) sensing a response of the resonator to the drive signal at the first and second sense electrodes;
   c) determining a frequency of maximum response for the first mode of vibration, and determining a frequency of maximum response for the second mode of vibration;
   d) deriving a comparison result from a comparison of the frequency of maximum response for the first mode of vibration with the frequency of maximum response for the second mode of vibration; and
   e) applying a biasing voltage to one or more of the tuning electrodes dependent on the comparison result, wherein the method comprises repeating steps a) to e) using a set of one or more first mode tuning electrodes in step (e) until the frequency of maximum response for the first mode of vibration is determined to be equal to the frequency of maximum response for the second mode of vibration, or until a difference between the frequency of maximum response for the first mode of vibration and the frequency of maximum response for the second mode of vibration is reduced to a minimum non-zero value, and if the difference between the frequency of maximum response for the first mode of vibration and the frequency of maximum response for the second mode of vibration is reduced to a minimum non-zero value, subsequently repeating steps (a) to (e) using a set of one or more second tuning electrodes in step (e) until the frequency of maximum response for the first mode of vibration is determined to be equal to the frequency of maximum response for the second mode of vibration in step (d).

2. A method according to claim 1, comprising, in step d), determining which of the tuning electrodes to apply the biasing voltage to, based on the comparison result.

3. A method according to claim 2, wherein, after the step of deriving the comparison result, the method comprises comparing the comparison result with a previous comparison result to determine which of the tuning electrodes to apply the biasing voltage to.

4. A method according to claim 1, comprising, in step e), determining a magnitude of the biasing voltage dependent on the comparison result.

5. A method according to claim 4, wherein the magnitude of the biasing voltage is increased from a previous biasing voltage by a predetermined amount.

6. A method according to claim 1, further comprising, prior to step a), applying a preliminary drive signal to one of the plurality of the electrodes on the resonator, the preliminary drive signal comprising a plurality of frequencies, sensing the response of the resonator to the preliminary drive signal at the plurality of the electrodes, and determining which of the plurality of the electrodes to operate as drive, sense and tuning electrodes based on the sensed response of the resonator to the preliminary drive signal.

7. A method according to claim 1, comprising recording a value of the biasing voltage or biasing voltages when the frequency of maximum response for the first mode of vibration is equal to the frequency of maximum response for the second mode of vibration.

8. A method according to claim 1, wherein the resonator is a circular disc.

9. A method according to claim 1, wherein the resonator and the frame comprise a single crystal of silicon.

10. A method according to claim 1, wherein the gyroscope comprises twelve electrodes on the frame, positioned around the resonator and one electrode positioned on the resonator.

11. A method according to claim 1, wherein the resonator is fixed to the frame through four anchors.

12. A method according to claim 1, wherein the drive signal excites first and second trigonal modes of vibration of the resonator.

* * * * *